United States Patent
Ring

[19]

[11] Patent Number: 5,875,536
[45] Date of Patent: Mar. 2, 1999

[54] METHOD AND APPARATUS FOR INSTALLING A SNAP-RING IN A SNAP-RING GROOVE AND DETECTING PROPER RADIAL EXPANSION THEREOF

[75] Inventor: Frank N. Ring, Windsor, Canada

[73] Assignee: Cobra Machine Tool Co., Inc., Tecumseh, Canada

[21] Appl. No.: 818,606

[22] Filed: Mar. 14, 1997

[51] Int. Cl.[6] .................................................. B23Q 17/00
[52] U.S. Cl. ............................ 29/407.1; 29/451; 29/717; 29/720; 29/229
[58] Field of Search ........................... 29/407.01, 407.04, 29/407.09, 407.1, 451, 453, 717, 229, 720

[56] References Cited

U.S. PATENT DOCUMENTS

| | | | |
|---|---|---|---|
| 2,840,892 | 7/1958 | Erdmann | 29/229 |
| 4,965,926 | 10/1990 | Komlos et al. | 29/229 |
| 5,315,746 | 5/1994 | Machino et al. | 29/451 |

FOREIGN PATENT DOCUMENTS

| 1117179 | 10/1984 | U.S.S.R. | 29/229 |
|---|---|---|---|

*Primary Examiner*—David P. Bryant
*Attorney, Agent, or Firm*—Howard & Howard

[57] ABSTRACT

An apparatus for installing a snap ring comprises an inner press assembly which is spring biased downwardly from an upper press assembly. The inner press assembly includes a plurality of arms having first ends having an abutment surface adjacent a notch. During installation of the snap ring, the upper press assembly and inner press assembly move toward a component which receives the snap ring, such that the first ends of the arms abut the snap ring. The snap ring is thus moved downwardly into the component. If the snap ring expands radially outwardly into the snap ring groove, the abutment moves past the snap ring and the notches receive the snap ring. If the snap ring does not expand sufficiently radially outwardly into the snap ring groove, the abutment surface of the arms contacts the snap ring, thereby resisting downward movement of the inner press assembly. There is then relative axial movement between the inner press assembly and the upper press assembly. When this movement occurs, thereby activating a switch is activated.

18 Claims, 7 Drawing Sheets

METHOD AND APPARATUS FOR INSTALLING A SNAP-RING IN A SNAP-RING GROOVE AND DETECTING PROPER RADIAL EXPANSION THEREOF

BACKGROUND OF THE INVENTION

The present invention relates to an apparatus for installing a snap ring which detects whether the snap ring has expanded radially outwardly into a snap ring groove.

Many components, particularly vehicle components, include snap rings mounted within an annular groove on an inner surface of the component. The snap rings secure an inner subcomponent within an outer subcomponent. Typically, an outer subcomponents generally has a generally cylindrical inner surface. An annular snap ring groove is formed on the inner surface of the outer subcomponent. An inner subcomponent is inserted in the outer and the snap ring moves into the groove to secure the two. This process is often used to secure to clutch components.

Generally, a machine for installing the snap ring includes a press which moves the snap ring axially into the outer subcomponent. The press typically includes an inwardly tapered surface which compresses the snap ring radially inwardly as the snap ring is inserted into the component. The snap ring is moved to be aligned with the groove and is then released. The snap ring should expand radially outwardly into the snap ring groove.

Known machines have been provided with a sensor for determining whether the snap ring has been inserted sufficiently axially into the vehicle component such that the snap ring should be aligned with the annular groove. Although aligned with the snap ring groove, the snap ring will sometime fail to expand radially outwardly into the snap ring groove, resulting in a defective product. The known machine does not insure that the snap ring is properly expanded radially outwardly into the snap ring groove.

SUMMARY OF THE INVENTION

The present invention provides a machine for installing a snap ring which detects whether the snap ring has expanded radially outwardly fully into the snap ring groove.

The snap ring installation machine of the present invention generally comprises a press movable toward a work holding station which carries inner and outer subcomponent. The outer subcomponent has an inner surface with an annular snap ring groove. The press generally comprises a upper assembly and a lower assembly both movable axially toward the component. The lower press assembly includes an outer housing and an inner press assembly. The outer housing includes a generally cylindrical inner surface having an inwardly tapered portion at a lower end. The inner press assembly and outer housing are each movable axially relative to the upper press assembly. A first plurality of heavy springs are disposed between the upper press assembly and the outer housing. A second plurality of heavy springs are disposed between the upper press assembly and the inner press assembly. The inner press assembly further includes a plurality of arms having upper ends extending generally downwardly and biased radially outwardly. A first end of each arm includes an abutment surface adjacent a notch. The notch is radially outward of the abutment surface. A switch is positioned between the upper press assembly and the lower press assembly.

During installation, the upper press assembly and lower press assembly are moved axially toward the subcomponents until the outer housing contacts the subcomponents. The upper press assembly and inner press assembly continue to move axially toward the component, and the arms of the inner press assembly move the snap ring axially downwardly into the outer subcomponent. The abutment surfaces of the plurality of arms abut the snap ring to move it axially downwardly. The snap ring is compressed radially inwardly as it moves axially through the inwardly tapered portion of the outer housing. The snap ring is inserted axially into the component until the snap ring reaches the snap ring groove. If the snap ring expands radially outwardly into the snap ring groove of the component, the snap ring will fit into the notches of the plurality of arms. Thus, the inner press assembly can move downwardly such that the abutment surfaces on the arms move beyond the snap ring. However, if the snap ring does not expand radially outwardly or if it expands insufficiently, at least one of the abutment surfaces of the plurality of arms will contact the snap ring. This stops the downward motion of the inner press assembly, compressing the springs between the upper press assembly and inner press assembly and causing relative axial movement between the upper press assembly and inner press assembly. Relative axial movement between the upper press assembly and inner press assembly activates a switch mounted between the upper press assembly and inner press assembly, thereby indicating that the snap ring did not fully expand into the snap ring groove.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
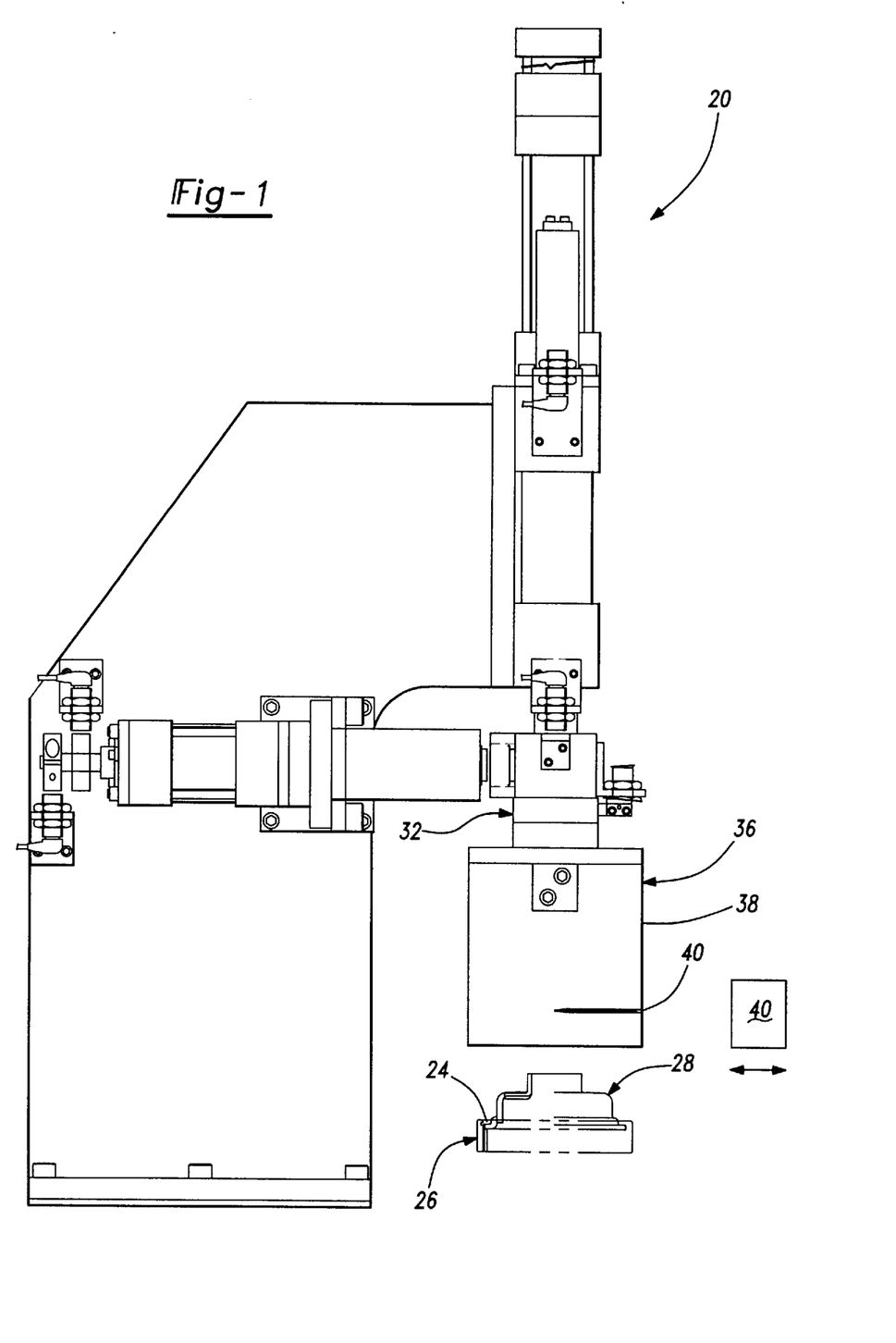
FIG. 1 is a side view of the snap ring installation apparatus of the present invention.

A snap ring installation apparatus 20 according to the present invention is shown in FIG. 1. The snap ring installation apparatus 20 installs a snap ring (not shown) into an annular snap ring groove 24 of a first component 26 to secure a second component 28 to the first component 26. The snap ring groove 24 of the first component 26 is formed on a generally cylindrical inner surface of the first component 26 circumferentially about the axis of the first component 26. This machine is particularly useful for securing clutch components.

The snap ring installation apparatus 20 generally comprises an upper press assembly 32 and a lower press assembly 36, both movable axially toward and away from the components 26 and 28. The lower press assembly 36 includes an outer cylindrical housing 38 having a slot 40 formed partially about the circumference of the housing 38 for inserting a snap ring radially into the housing 38 from a machine 41. Machine 41 is generally known in the art, is not part of the present invention and is shown schematically.

Figure 2:
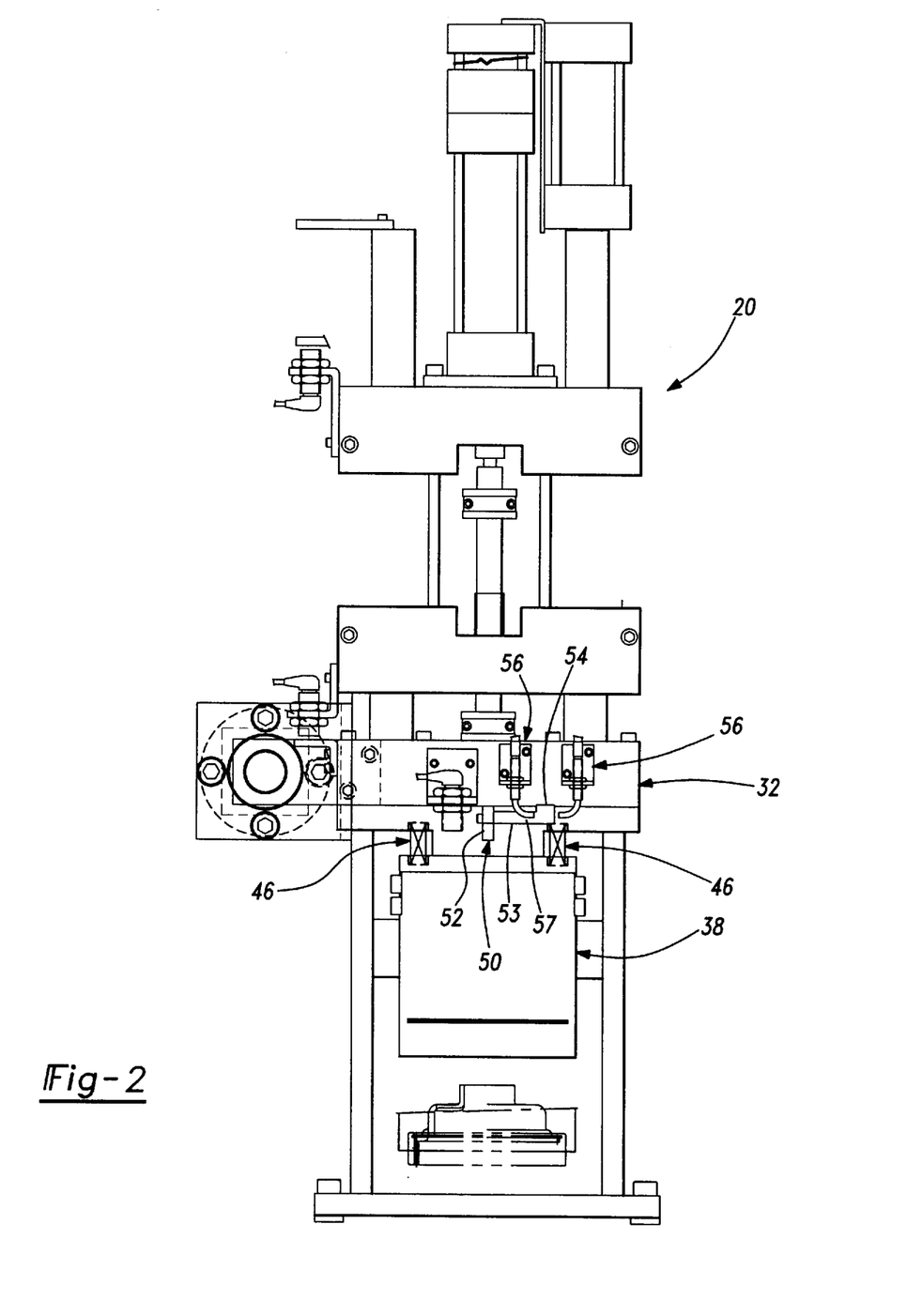
FIG. 2 is a front view of the apparatus of FIG. 1.

As can be seen in FIG. 2, a plurality of springs 46 are circumferentially spaced and disposed between the housing 38 and the upper press assembly 32. A lever 50 is pivotally mounted to the upper press assembly 32 and includes a leg 52 extending downwardly. A lateral extension 53 extends laterally from an opposite end of the lever 50. A finger 54 extends upwardly from the extension 53 into an optical switch 56. The lever 50 is pivotally mounted to the upper press assembly 32 between the leg 52 and the finger 54. The finger 54 end of the lever 50 is spring biased upwardly. The lateral extension 53 of the lever 50 includes a recess 57 into which half of the optical switch 56, i.e. the transmitter or receiver, is normally disposed.

Figure 3:
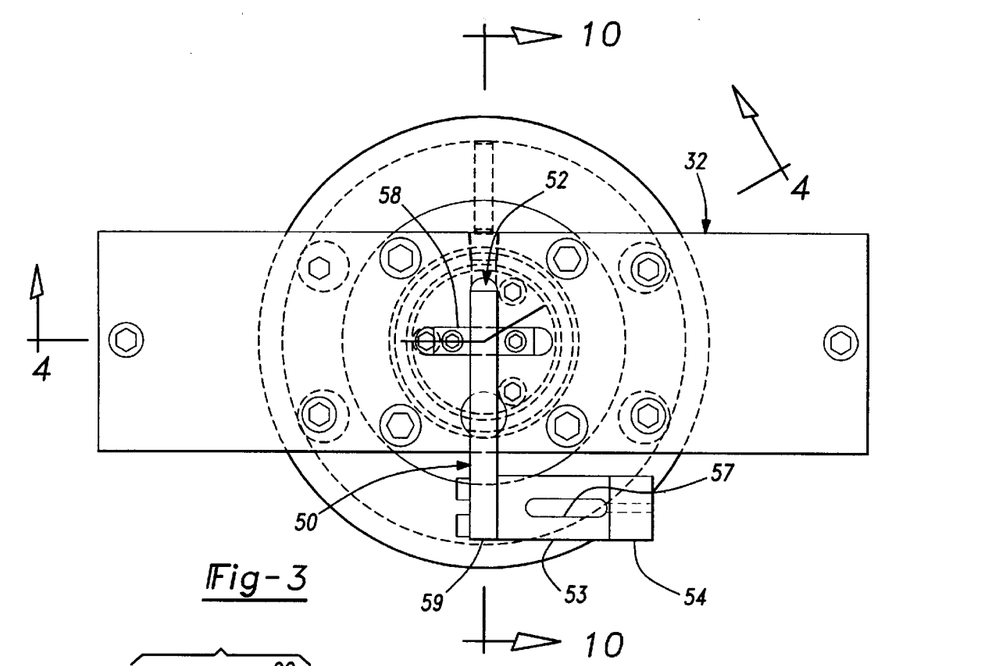
FIG. 3 is a plan view of the apparatus of FIG. 1.

As can be seen in FIG. 3, the lever 50 is mounted to the upper press assembly 32 and pivots on a fulcrum 58 between the leg 52 and the finger 54. The finger 54 extends upwardly from the lateral extension 53 from an end 59 of the lever 50. The lateral extension includes the elongated recess 57 extending generally between the end 59 of the lever 50 toward the finger 54.

Figure 4:
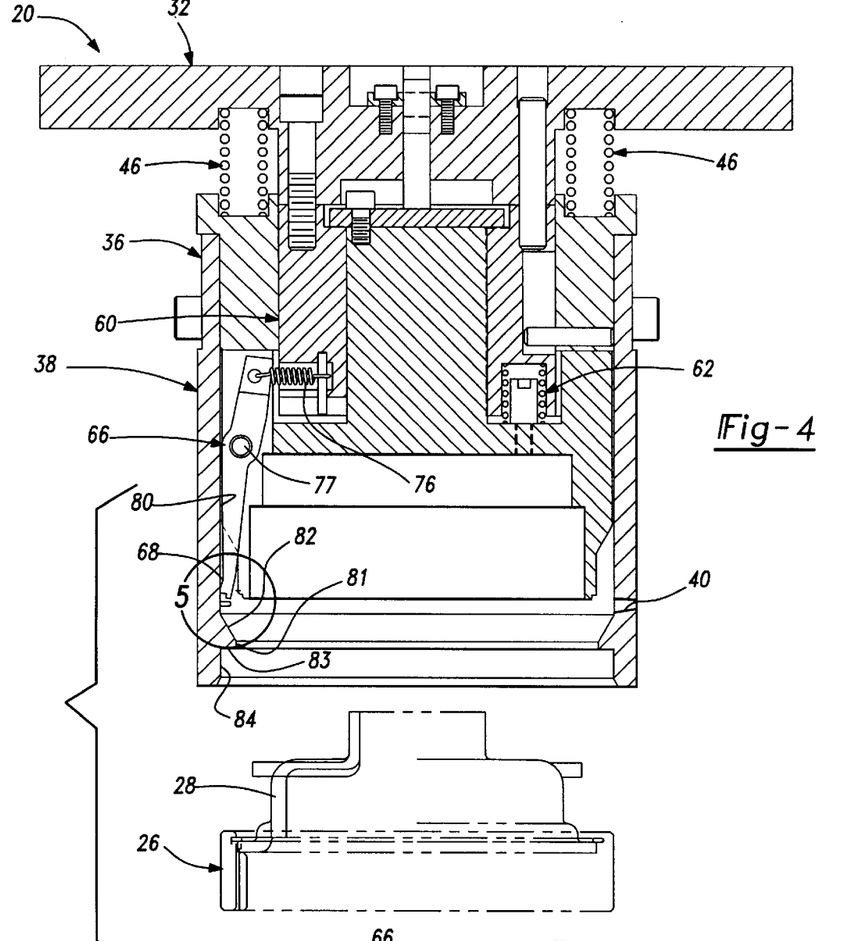
FIG. 4 is a sectional view taken along line 4—4 of FIG. 3.

Referring to FIG. 4, the lower press assembly 36 further includes an inner press assembly 60 which is movable axially relative to the upper press assembly 32. Further, the outer housing 38 is movable axially relative to the inner press assembly 60 and the upper press assembly 32. A plurality of heavy springs 62 are mounted between the upper press assembly 32 and the inner press assembly 60. The inner press assembly 60 includes a plurality of arms 66 (one shown) circumferentially spaced about the inner press assembly 60. Each of the arms 66 includes a first end 68 extending downwardly. A spring 76 is secured to the upper press assembly 32 and to the arm 66 opposite the first end 68. The arm 66 is pivotally mounted at 77 to the inner press assembly 60 between the first end 68 and the spring 76. Thus, the first end 68 of each of the arms 66 is biased radially outwardly against a generally cylindrical inner surface 80 of the housing 38. The inner surface 80 of the housing 38 includes an annular inward projection 81 spaced from a lower end of the housing 38. The annular projection 81 has an inwardly tapered surface 82 adjacent an axial engagement surface 83. The housing 38 further includes a generally cylindrical portion 84 between the engagement surface 83 and the lower end of the housing 38.

Slot 40 is shown, and as described above, a machine 41 moves snap rings through slot 40 to be inserted by the machine.

Figure 5:
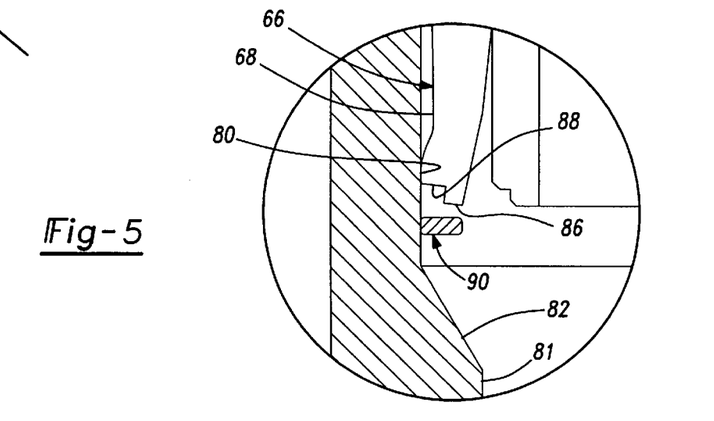
FIG. 5 is an enlarged view of the area 5 of FIG. 4.

As can be seen in FIG. 5, the first end 68 of each arm 66 has an abutment surface 86. A notch 88 is formed in the first end 68 of each of the arms 66 radially outwardly adjacent to the abutment surface 86.

During operation, a snap ring 90 is inserted into the housing 38 through the slot 40. The snap ring 90 is initially positioned just below the plurality of arms 66 adjacent the abutment surfaces 86. The upper press assembly 32 and lower press assembly 36 are then moved downwardly toward the component 26 until the component 26 is received within the lower cylindrical portion 84 of the housing 38. When the component 26 abuts the engagement surface 83 of the housing 38, the upper press assembly 32 and inner press assembly 60 continue to move downwardly, thereby compressing springs 46. Simultaneously, the downward movement of the inner press assembly 60 and the plurality of arms 66 causes the abutment surfaces 86 of the arms 66 to contact the snap ring 90 and move the snap ring 90 downwardly relative to the housing 38. The snap ring 90 is compressed radially inwardly as it moves axially through the inwardly tapered surface 82 of the housing 38. The inner press assembly 60 and snap ring 90 continue to move downwardly until the snap ring 90 is aligned with the snap ring groove 24 of the component 26 as shown in FIG. 6.

Figure 6:
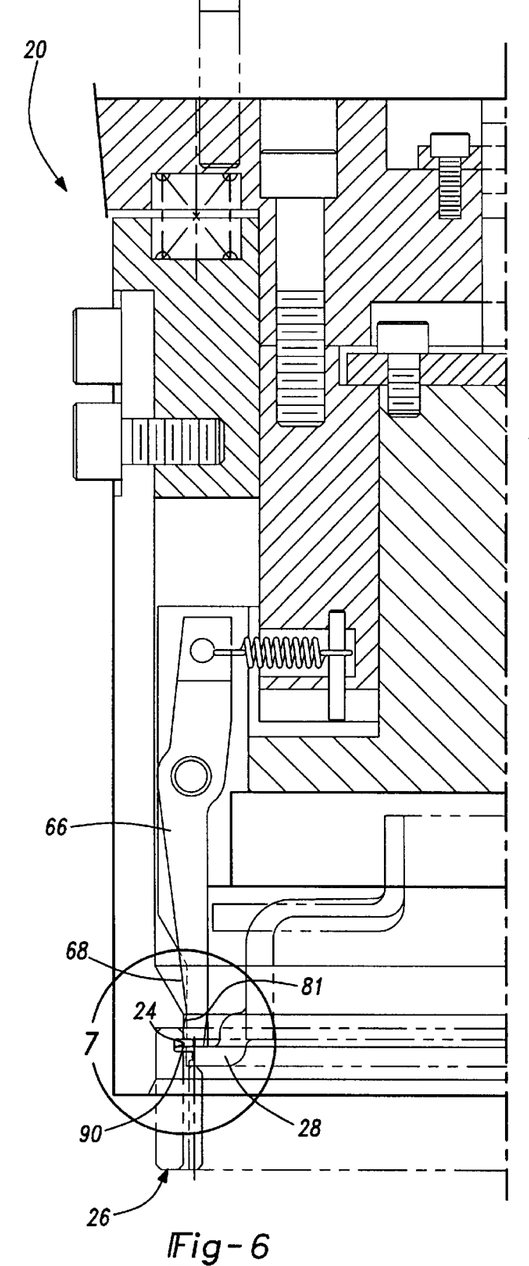
FIG. 6 is a view similar to FIG. 4 of the apparatus when the snap ring is expanded radially into the snap ring groove.
Figure 7:
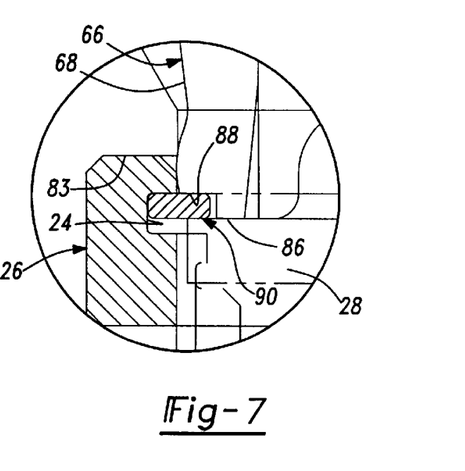
FIG. 7 in an enlarged view of the area 7 of FIG. 6.

In FIGS. 6 and 7, the snap ring 90 is shown having expanded properly radially into the snap ring groove 24 of the component 26. The first end 68 of the arm 66, though biased radially outwardly is moved inwardly by the annular inward projection 81, such that the abutment surface 86 of the arm 66 is positioned radially inward of the snap ring 90 and the snap ring 90 is positioned in the notch 88 of the arm 66 as can be seen in FIG. 7. This figure shows a successful connection of the components 26 and 28.

Figure 8:
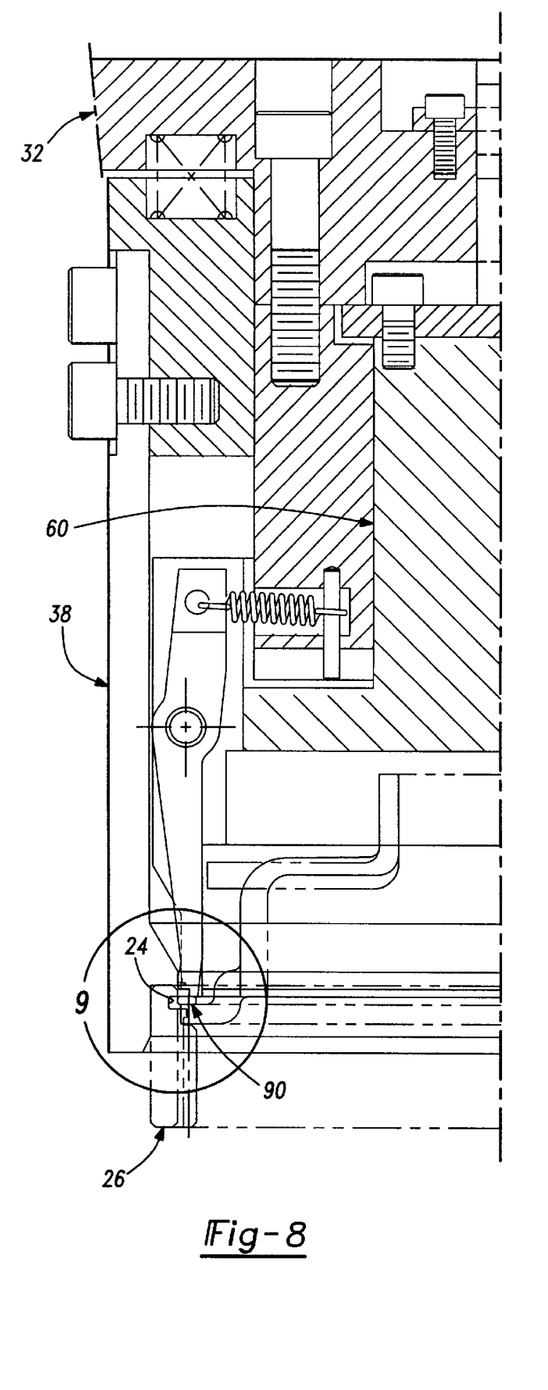
FIG. 8 is a view similar to FIG. 6 wherein the snap ring has not expanded into the snap ring groove.
Figure 9:
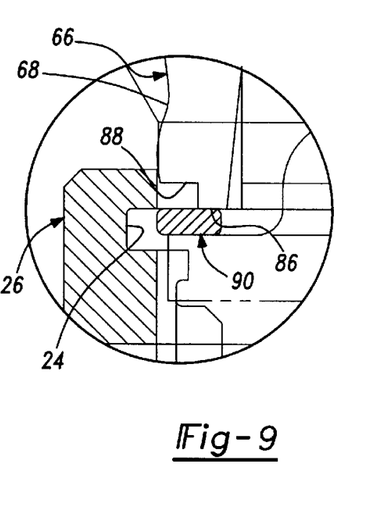
FIG. 9 is an enlarged view of the area 9 of FIG. 8.

Referring to FIGS. 8 and 9, if the snap ring 90 should fail to expand radially outwardly into the snap ring groove 24, the abutment surface 86 of the arm 66 will contact the snap ring 90 thereby resisting the downward motion of the inner press assembly 60. Upper press assembly 32 continues to move downwardly causing upward axial movement of the inner press assembly 60 relative to the upper press assembly 32 and compressing springs 62 (see FIG. 4). As can be seen in FIG. 8, the entire upper press assembly 32 has moved downwardly relative to the inner press assembly 60 approximately a distance equal to the depth of the notch 88 from the abutment surface 86.

Figures 10A, 10B:
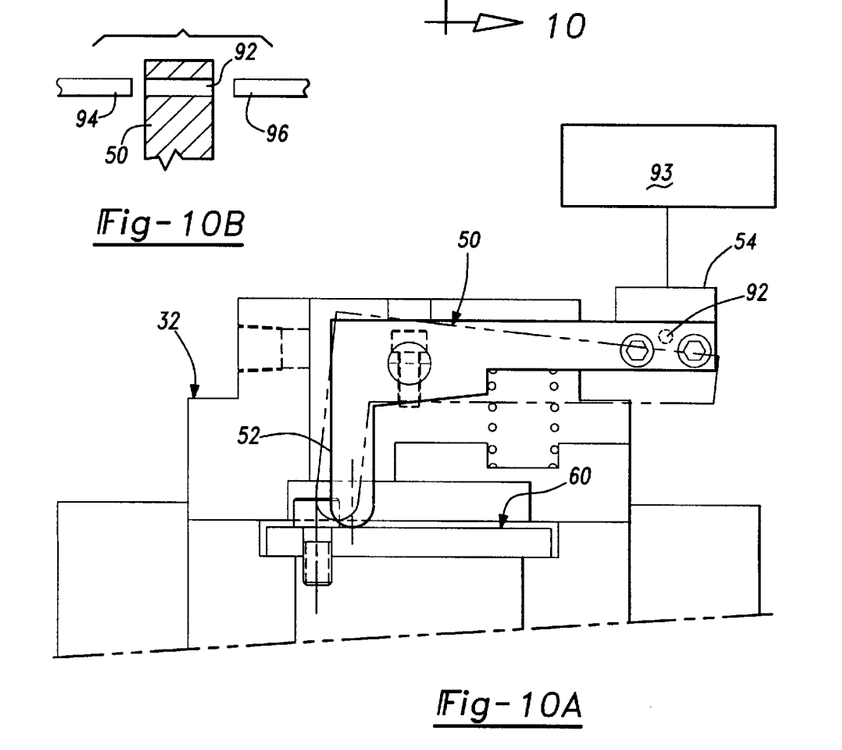
FIG. 10A is a sectional view taken along line 10—10 of FIG. 3.
FIG. 10B shows a switch schematically.

As shown in FIG. 10A, when the inner press assembly 60 moves relative to the upper press assembly 32, the leg 52 of the lever 50 is driven upwardly. As a result, the finger 54 moves downwardly and switches the optical switch 56 to indicate that the snap ring is not properly installed in the snap ring groove 24. The optical switch 56 sends a signal to a controller 93 or other indicator.

In one embodiment, the lever 50 is formed with the hole 92. As shown in FIG. 10B, a light source 94 is aligned at one end of the hole 92, and other end of hole 92. The light source 94 can thus direct a beam through hole 92 to sensor 96 when lever 50 is at a to normal position. This provides a signal that the snap ring has been properly inserted. If light from source 94 does not reach sensor 96 at the end of a cycle of the machine, then a signal is sent that the snap ring was not properly inserted. An alarm of some sort may then be actuated to alert an operator. The details of the switch shown here are preferred, but other switches come within the scope of this invention. Of course, the light source and sensors could be arranged such that light would only reach the sensor when an improper connection has been made, rather than when a proper connection has been made.

Figure 11:
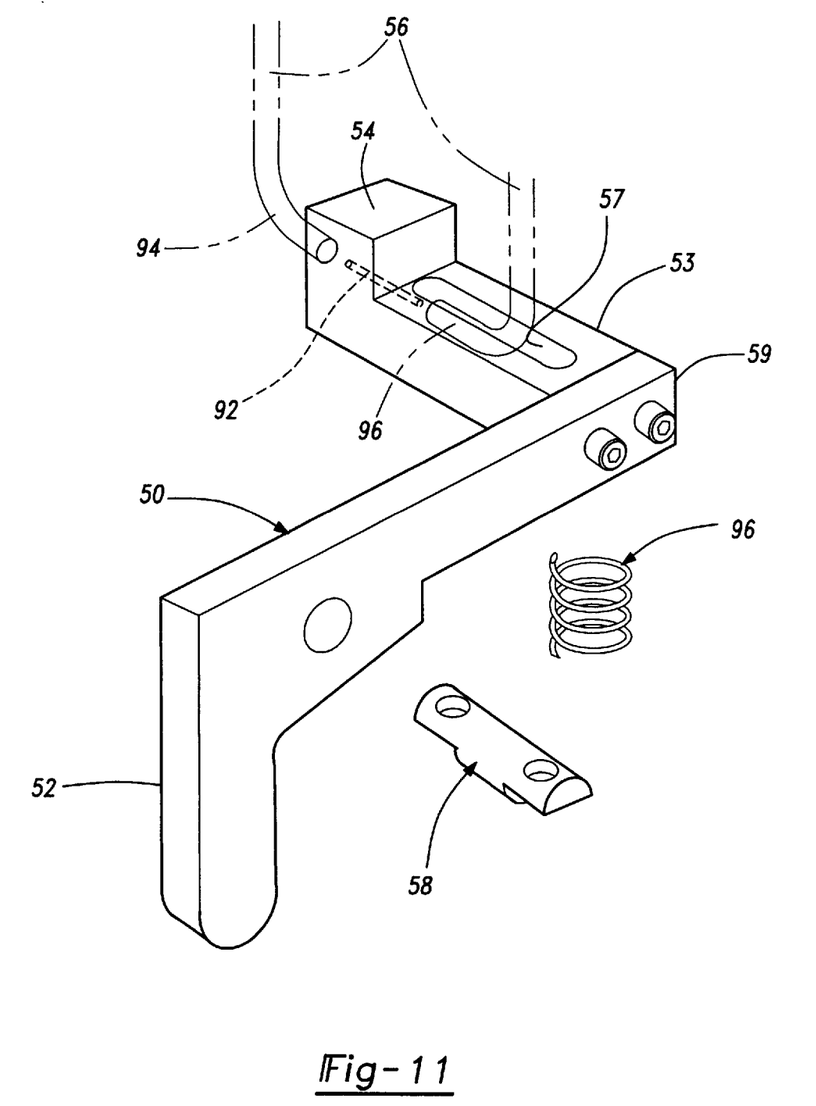
FIG. 11 is an exploded perspective view of the switch of FIG. 2.

Referring to FIG. 11, lever 50 pivots about a fulcom 58 between end 59 and leg 52. The spring 97 biases finger 54 upwardly to its normal position. Extension 53 includes a recess 57 into which one of source 94 or sensor 96 are normally inserted. In this way, it is ensured the two are aligned with hole 92. Normally, finger 54 of the lever is positioned such that hole 92 is aligned between the source 94 and sensor 96.

In accordance with the provisions of the patent statutes, the present invention has been described in what is considered to represent a preferred embodiment. However, it should be understood that the invention can be practiced otherwise than as specifically illustrated and described without departing from its spirit or scope.

What is claimed is:

1. A method for installing a snap-ring into a component having a snap-ring groove including the steps of:
    a) compressing a snap-ring radially inwardly from a radially expanded first position to a radially compressed second position;
    b) inserting said compressed snap-ring into a component having an axis and a snap-ring groove circumferentially disposed about said axis;
    c) aligning said snap-ring with said snap-ring groove in said component;
    d) releasing said snap-ring after said step c); and
    e) detecting whether said snap-ring has expanded radially outwardly after said step d), wherein said detecting step comprises
        providing an abutment surface on a first end of an arm;
        inserting said arm axially into said component; and
            contacting said snap-ring with said abutment surface when said snap-ring has not expanded radially outwardly, said abutment surface not contacting said snap-ring when said snap-ring has expanded radially outwardly.

2. The method of claim 1 further including the steps of:
    f) detecting that said snap-ring has not expanded radially outwardly;
    g) generating a signal after said step f) indicating that said snap-ring has not expanded radially outwardly.

3. The method of claim 1 further including the steps of:
    providing a notch adjacent said abutment surface at said first end of said arm;
    said notch moving onto said snap-ring when said snap-ring is expanded radially outwardly.

4. The method of claim 1 further including the steps of:
    providing a plurality of said arms each having said abutment surface on said first end;
    inserting said plurality of said arms into said component;
    generating a signal if at least one of said plurality of abutment surfaces contacts said snap-ring.

5. A method for installing a snap-ring into a component having a snap-ring groove including the steps of:
    a) compressing a snap-ring radially inwardly from a radially expanded first position to a radially compressed second position;
    b) inserting said compressed snap-ring into a component having an axis and a snap-ring groove circumferentially disposed about said axis;
    c) aligning said snap-ring with said snap-ring groove in said component;
    d) releasing said snap-ring;
    e) providing an abutment surface on a first end of an arm;
    f) inserting said arm axially into said component;
    g) biasing said first end of said arm radially outwardly;
    h) contacting said snap-ring with said abutment surface when said snap-ring has not expanded radially outwardly; and
    i) detecting whether said snap-ring has expanded radially outwardly after said step d).

6. A machine for installing a snap-ring into a component having a snap-ring groove comprising:
    means for compressing a snap-ring radially inwardly from a radially expanded first position to a radially compressed second position;
    means for inserting the compressed snap-ring into a component having an axis and a snap-ring groove circumferentially disposed about the axis; and
    an abutment surface for determining whether the snap-ring is radially expanded into the snap-ring groove, said abutment surface contacting the snap-ring when the snap-ring is not expanded into the snap-ring groove and not contacting the snap-ring when the snap-ring is expanded into the snap-ring groove.

7. The machine of claim 6 further including a notch adjacent said abutment surface, said notch receiving a snap-ring that has expanded radially outwardly.

8. The machine of claim 7 further including a first press assembly and a second press assembly both moveable axially relative to said component, at least one arm having said abutment surface and being mounted to said second press assembly, said second press assembly axially moveable to a first position relative to said first press assembly when said abutment surface contacts a snap-ring which is not expanded.

9. The machine of claim 6 further including an arm biased radially outwardly and including said abutment surface, said abutment surface of said arm contacting the snap ring when the snap ring is not expanded radially.

10. A machine for installing a snap-ring into a component having an axis and a snap-ring groove circumferentially disposed about the axis, said machine comprising:
    a press for moving a snap-ring axially into a component along a first path;
    at least one arm movable axially into the component, said arm having an abutment surface at a first end contacting a snap-ring when the snap-ring is not expanded into a snap-ring groove and said at least one arm includes a notch adjacent said abutment surface at said first end, a snap-ring disposed within said notch when the snap-ring is expanded radially outwardly; and
    a switch connected to said arm, said switch indicating when said abutment surface of said arm contacts a snap-ring and the snap-ring is not expanded into the snap-ring groove.

11. The machine of claim 10 wherein said press includes an inwardly tapered housing compressing the snap-ring radially inwardly from a radially expanded first position to a radially compressed second position.

12. The machine of claim 10 wherein said at least one arm is biased radially outwardly.

13. The machine of claim 10 wherein said arm is coupled to said press, said arm pressing a snap-ring axially into a component.

14. The machine of claim 10 wherein said arm moves axially relative to said press when the snap-ring is not expanded into the snap-ring groove.

15. The machine of claim 10 wherein there are a plurality of said arms.

16. The machine of claim 10 wherein said press comprises a first press assembly and a second press assembly both moveable axially relative to said component, said at least one arm being mounted to said second press assembly, said second press assembly being axially moveable to a first position relative to said first press assembly when said abutment surface of said at least one arm contacts a snap-ring which is not radially expanded sufficiently.

17. The machine of claim 16, wherein a mechanical lever is actuated when said first and second press assemblies move relative to each other, said lever actuating a switch to provide an indication that a snap ring is not properly received in a component.

18. The machine of claim 17, wherein said lever moves between a light source and a light sensor to provide said indication.

* * * * *